3,233,734
FILTERING APPARATUS
Hans Müller, Erlenbach, Zurich, Switzerland
Filed June 12, 1962, Ser. No. 201,920
Claims priority, application Switzerland, June 13, 1961,
A 4,596/61
6 Claims. (Cl. 210—216)

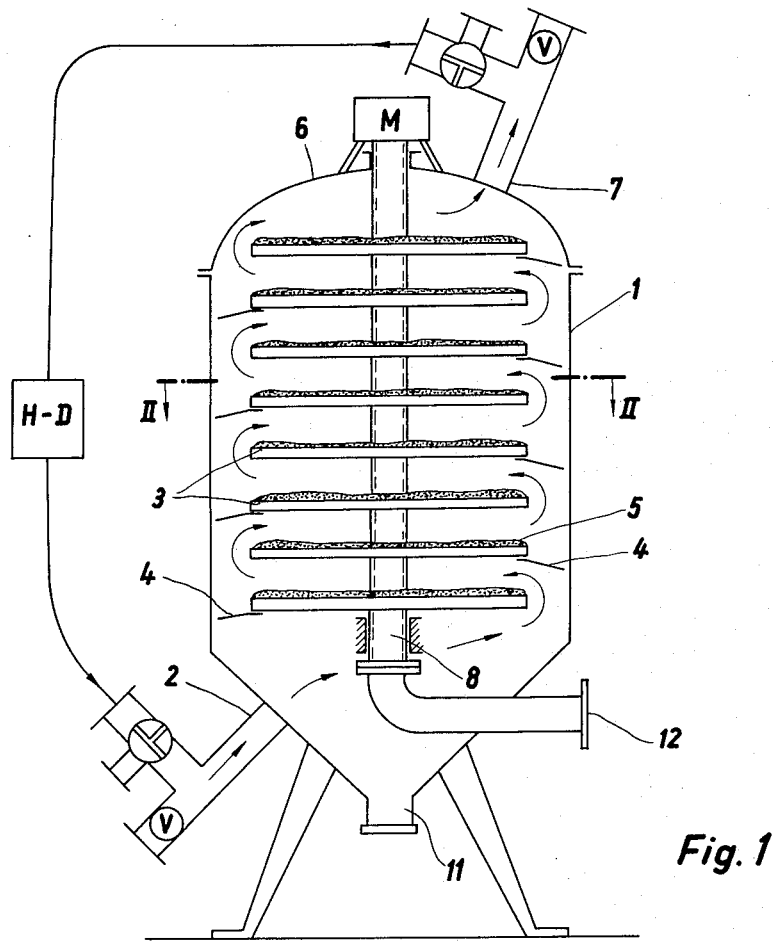
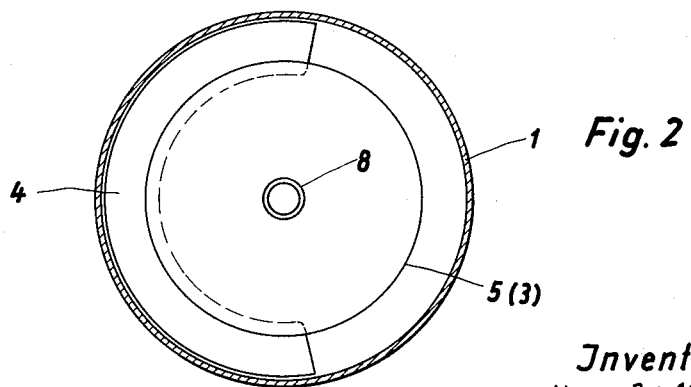
Fig. 1
Fig. 2
Inventor:
Hans Müller

United States Patent Office 3,233,734
Patented Feb. 8, 1966

The present invention relates to a filtering apparatus.

In my co-pending application Serial No. 814,427, filed may 20, 1959, it has been proposed to dry the filter cake accruing on filter elements located in a housing, for instance by blowing a heated gas through the housing. It is also possible to heat the housing of the filtering apparatus from the outside, for instance by passing a heating medium through a jacketed wall portion of the housing, and several other means for drying the filter cake while still located on the filter elements have been proposed. Up to now it seemed that the most economical and simple manner of drying the filter cake on the filter elements was the blowing of hot gas through the filter housing. However, the amount of drying agent, i.e. hot gas which is required when the same is blown through the filter housing, for instance from an inlet located in the lower portion of the housing to an outlet located in the upper portion thereof, is very large. This is mainly due to the fact that the gaseous heating medium while passing through the filter housing will withdraw only a relatively small portion of moisture from the filter cake.

Experiments have shown, that for instance one cubic meter of hot air will, somewhat depending on temperature and pressure, withdraw only about 25 grams of water from the wet filter cake. It follows that for the drying of a single charge of filter cake in a filtering apparatus of medium size, about 12,000 cubic meters of drying gas are required. Furthermore, due to the uneven distribution of the stream of drying gas in the filter housing, only a portion of the drying gas is utilized and thus actually the required amount of drying gas is a multiple of the figure given above.

It is therefore an object of the present invention to provide an apparatus for reducing the moisture content of such filter cake in a simple and economical manner.

It is a further object of the present invention to provide an apparatus for reducing the moisture content of the filter cake in the filtering apparatus with better utilization of the drying capacity of the drying fluid or heating gas so that the total quantity thereof required to dry a given filter cake will be reduced.

It is yet another object of the present invention to provide an apparatus for drying filter cake located on filter elements as described above in a relatively short period of time.

Other objects and advantages of the present invention will become apparent from a further reading of the description and of the appended claims.

With the above and other objects in view, the present invention contemplates in a filtering apparatus, in combination, a housing having a vertical axis and an upper and a lower end portion, drying fluid inlet and outlet means, the inlet means being arranged at one of the end portions and the outlet means being arranged at the other of the end portions, an elongated hollow shaft substantially coaxial with the housing supported for rotation about its axis by the housing, a plurality of substantially horizontally extending filter elements located in the housing spaced from the upper and lower end portions thereof and carried by the hollow shaft for rotation therewith and communicating with the interior of the same, the filter elements, respectively, being superposed upon and vertically spaced from each other, drive means operatively connected to the shaft for rotating the latter and the filter elements carried by the same, and means for directing drying fluid through the housing from the inlet means to the outlet means along a meandering path passing successively between adjacent ones of the superposed filter elements.

According to a preferred embodiment, the filtering apparatus of the present invention comprises, in combination, a housing of substantially cylindrical configuration over most of its length and having a vertical axis and an upper and a lower end portion and a main portion therebetween, the lower end portion of the housing being of a reduced cross-sectional area as compared to the main portion thereof, heating gas inlet and outlet means, the inlet means being arranged at the lower end portion and the outlet means being arranged at the upper end portion, an elongated hollow shaft substantially coaxial with the housing supported for rotation about its axis by the housing, a plurality of substantially horizontally extending filter elements each having a substantially circular outer rim located in the main portion of the housing spaced from the upper and lower end portions thereof and carried by the hollow shaft for rotation therewith and communicating with the interior of the same, the filter elements, respectively, being superposed upon and vertically spaced from each other, drive means operatively connected to the shaft for rotating the latter and the filter elements carried by the same, and a plurality of baffle means each being attached respectively to a different one of the filter elements along a circumferential portion of the outer rim of the latter subtending an angle of between about 170 and 240° and extending radially across the annular space for directing drying fluid through the housing from the inlet means to the outlet means along a meandering path passing successively between adjacent ones of the superposed filter means, the baffle means attached to successive filter elements being located alternatingly diametrically opposite to each other.

Thus, according to the present invention, the amount of heating gas or drying fluid which was required up to now is reduced by passing the heating gas or the like along a meandering path over the cake carried by the individual filter elements in the housing. The direction of flow of the heating gas along adjacent superposed filter cakes will be reversed by the baffle means which extend radially across the annular space between the respective filter element and the inner face of the housing wall and which are attached to successive filter elements so as to be located alternatingly diametrically opposite to each other. In this manner, not only the required amount of drying gas is reduced but, in addition, the time required for drying the superposed filter cakes is also very considerably reduced. For instance, in a given filtering apparatus, arrangement of the baffle means according to the present invention reduced the required drying time from 15 hours to about 4 hours.

Preferably, the baffle means comprise sheet metal elements which are fixed to about one-half of the total circumference or outer rim of the respective circular filter element and extend radially towards the inner wall of the housing thus obstructing about half of the annular space between the housing and the circumference of the respective filter element. Baffles attached to adjacent superposed filter elements are arranged in staggered relationship by being located alternatingly diametrically opposite to each other.

Thus, the heating fluid or the like, irrespective of whether the same passes upwardly or downwardly through the filtering apparatus, will be deflected by a baffle means so as to change its upward or downward direction of flow to a substantially horizontal flow passing along the surface of the filter cake located on the filtering element directly adjacent the one to which the deflecting baffle means is attached. After thus flowing horizontally substantially through the entire cross section of the filtering apparatus, the heating fluid will again flow upwardly or downwardly at the side of the filtering apparatus which is opposite to the above mentioned baffle means and will then be deflected by contact with the next baffle means which is arranged diametrically opposite to the first baffle means at the rim of the filtering element below and/or above the filtering element to which the first mentioned baffle means is fixed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view partially in cross section of a filtering apparatus according to the present invention; and FIG. 2 is a cross-sectional plan view taken along line II—II of FIG. 1.

Referring now to the drawing, it will be seen that a filter housing 1 is provided with inlet and outlet means 2 and 7 which are arranged respectively in the lower and upper end portions of the filter housing 1. Either element 2 or element 7 may serve as the inlet means and the other of the two elements will then serve as the outlet means. In the illustrated embodiment, either element 2 or element 7 may also serve as inlet means for the material which is to be filtered.

In addition, the above described inlet and outlet means serve for introducing into and withdrawing heating gas from the filter housing. A suitable T-pipe and valve arrangement is schematically indicated which will permit the use of inlet and outlet means 2 and 7 as desired. Assuming that the filter cake has been formed and filtration has been completed, the heating gas may for instance enter the filter housing through inlet 2 and will then flow in the direction of the arrows along a meandering path between adjacent filter elements 3 and above filter cakes 5. The heating gas is forced to flow along this meandering path by baffle means 4 which consist essentially of sheet metal or the like elements attached to about half or preferably somewhat more than half of the outer rim of the respective filter element. This can be clearly seen in FIG. 2 wherein sheet metal baffle means 4 occupies somewhat more than half of the annular space between filter element 3 and the inner wall of circular housing 1. Eventually, the heating gas will leave housing 1 through outlet 7.

It is sometimes desired to recirculate the heating gas from outlet 7 to inlet 2 as schematically indicated in FIG. 1. During such recirculation, the heating gas may be dried or heated in conventional apparatus known for such purpose and indicated schematically as H–D.

During the passage or flow of the heating gas along the surface of the individual filter cake layers 5, the latter will be progressively dried.

It is preferred to arrange sheet metal baffle means 4 along a somewhat more than one-half of the circumference of filter element 3, since thereby the fixing of the baffle to the filter element is facilitated and, furthermore, the heating air is prevented from flowing directly upwardly, or downwardly, as the case may be, without following the meandering path indicated by the arrow in FIG. 1.

However, while it is preferred that the baffle means subtend an angle of somewhat more than 180°, and preferably an angle of between about 190 and 220°, more broadly it may also be contemplated to arrange baffle means which will subtend an angle of between about 170 and 240°. In most cases, however, it will be preferred that the angle will be at least 180° or even somewhat greater. The individual filter elements 3 are carried by hollow shaft 8 and during the filtration preceding the drying of the filter cake, solids-containing liquid which is to be filtered will be introduced into filter housings through either element 2 or element 7 as has been described further above. Filtrate will pass through filter elements 3 into hollow shaft 8 to be withdrawn at 12, while a filter cake will be formed on the individual filter elements 3. The dried filter cake which may be loosened from the supporting filter elements by quickly rotating the latter will fall downwardly and leave the apparatus through outlet 11.

The hollow shaft 8 and the filter elements carried by the same may rotate about the axis of hollow shaft 8 and means for rotating shaft 8 are schematically indicated by the letter M.

The drying effect of the above described arrangement is greatly improved by slowly rotating shaft 8 and the filter elements with the filter cake thereon during the passage of gas as indicated by the arrows in FIG. 1, or in a direction opposite thereto. In fact, the rotating of filter elements 3 during the drying is considered an important improvement over the passage of heating gas along a meandering path between stationary filter elements.

It is also possible to carry out the above described process in the illustrated apparatus by partly or fully closing the outlet, for instance outlet 7 in which case all or some of the heating gas will be forced through filter cake 5 into filter elements 3 and from there into hollow shaft 8, to leave eventually through inlet 12.

It will be understood that each of the elements described above, or two or more together, may also find a useful application in other types of filtering apparatus differing from the types described above.

While the invention has been illustrated and described as embodied in a rotating disc filter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; drying fluid inlet and outlet means, said inlet means being arranged at one of said end portions and said outlet means being arranged at the other of said end portions; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a substantially semi-circular circumferential portion of the outer rim of the latter and extending in staggered relationship radially across said annular space for directing drying fluid through said housing from said inlet means to said outlet means along a meandering path passing successively between adjacent ones of said superposed filter means.

2. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; drying fluid inlet and outlet means, said inlet means being arranged at one of said end portions and said outlet means being arranged at the other of said end portions; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a substantially semi-circular circumferential portion of the outer rim of the latter and extending radially across said annular space for directing drying fluid through said housing from said inlet means to said outlet means along a meandering path passing successively between adjacent ones of said superposed filter means said baffle means attached to successive filter elements being located alternatingly diametrically opposite to each other.

3. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; drying fluid inlet and outlet means, said inlet means being arranged at one of said end portions and said outlet means being arranged at the other of said end portions; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a circumferential portion of the outer rim of the latter subtending an angle of at least 170° and extending radially across said annular space in staggered relationship for directing drying fluid through said housing from said inlet means to said outlet means along a meandering path passing successively between adjacent ones of said superposed filter means.

4. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; drying fluid inlet and outlet means, said inlet means being arranged at one of said end portions and said outlet means being arranged at the other of said end portions; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a circumferential portion of the outer rim of the latter subtending an angle of between about 170 and 240° and extending radially across said annular space in staggered relationship for directing drying fluid through said housing from said inlet means to said outlet means along a meandering path passing successively between adjacent ones of said superposed filter means.

5. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; heating gas inlet and outlet means, said inlet means being arranged at said lower end portion and said outlet means being arranged at said upper end portion; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a circumferential portion of the outer rim of the latter subtending an angle of between about 170 and 240° and extending radially across said annular space for directing heating gas through said housing from said inlet means to said outlet means along a meandering path passing successively between adjacent ones of said superposed filter means, said baffle means attached to successive filter element being located alternatingly diametrically opposite to each other.

6. In a filtering apparatus, in combination, a housing of substantially cylindrical configuration over most of its length and having a vertical axis and an upper end portion and a lower end portion and a main portion therebetween, said lower end portion of said housing being of a reduced cross-sectional area as compared to said main portion thereof; means for introducing into said housing solids-containing liquid to be filtered; heating gas inlet and outlet means, said inlet means being arranged at said upper end portion and said outlet means being arranged at said lower end portion; an elongated hollow shaft substantially coaxial with said housing supported for rotation about its axis by said housing; a plurality of substantially horizontally extending filter elements each having a substantially circular outer rim located in said main portion of said housing spaced from said upper and lower end portions thereof and carried by said hollow shaft for rotation therewith and communicating with the interior of the same, so that solids-free liquid may pass through said filter elements into said hollow shaft while solids will be retained on said filter elements forming a cake thereon, said filter elements, respectively, being superposed upon and vertically spaced from each other; drive means operatively connected to said shaft for rotating the latter and said filter elements carried by the same; and a plurality of baffle means each being attached respectively to a different one of said filter elements along a circumferential portion of the outer rim of the latter subtending an angle of between about 170 and 240° and extending radially across said annular space for directing heating gas through said housing from said inlet means to said outlet means along a meandering path passing successively between adjacent ones of said superposed filter means, said baffle means attached to successive filter elements being located alternatingly diametrically opposite to each other.

References Cited by the Examiner
UNITED STATES PATENTS

| | | | |
|---|---|---|---|
| 920,739 | 5/1909 | Hedges et al. | 210—331 |
| 1,219,796 | 3/1917 | Atkins et al. | 210—327 |
| 1,564,783 | 12/1925 | Harris | 210—68 X |
| 1,604,652 | 10/1926 | Manning | 210—68 X |
| 2,030,734 | 2/1936 | Baird | 34—77 X |
| 2,544,402 | 3/1951 | Tessmer | 210—331 |
| 2,824,646 | 2/1958 | Willenborg | 210—68 |

REUBEN FRIEDMAN, *Primary Examiner.*

HERBERT L. MARTIN, *Examiner.*

UNITED STATES PATENT OFFICE
CERTIFICATE OF CORRECTION

Patent No. 3,233,734                      February 8, 1966

Hans Müller

It is hereby certified that error appears in the above numbered patent requiring correction and that the said Letters Patent should read as corrected below.

In the heading to the printed specification, line 5, for "Switzerland" read -- Austria --.

Signed and sealed this 3rd day of January 1967.

(SEAL)
Attest:

ERNEST W. SWIDER
Attesting Officer

EDWARD J. BRENNER
Commissioner of Patents